Sept. 6, 1932.  E. F. HEARD  1,876,415
METHOD AND APPARATUS FOR SEALING LEAKS
Filed May 19, 1927  3 Sheets-Sheet 1
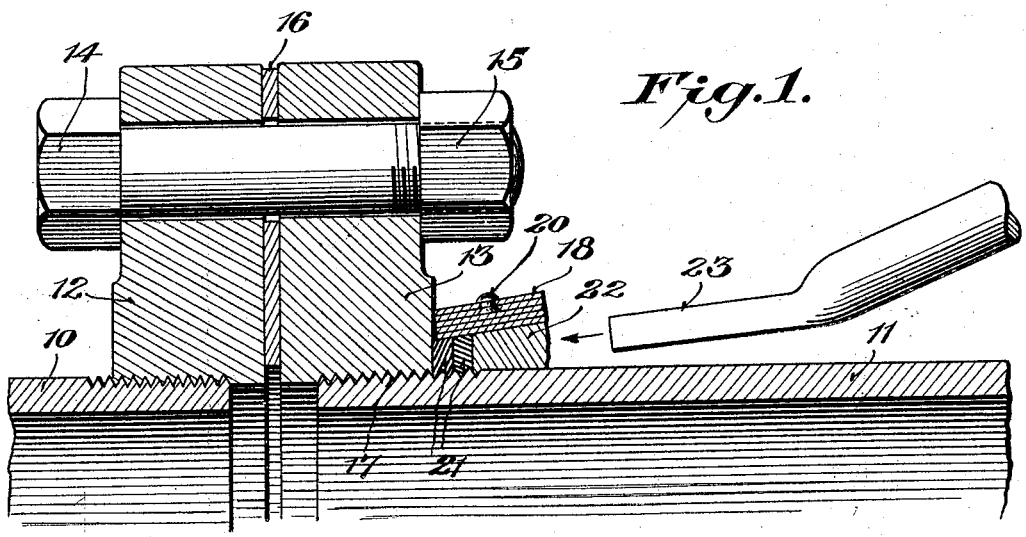
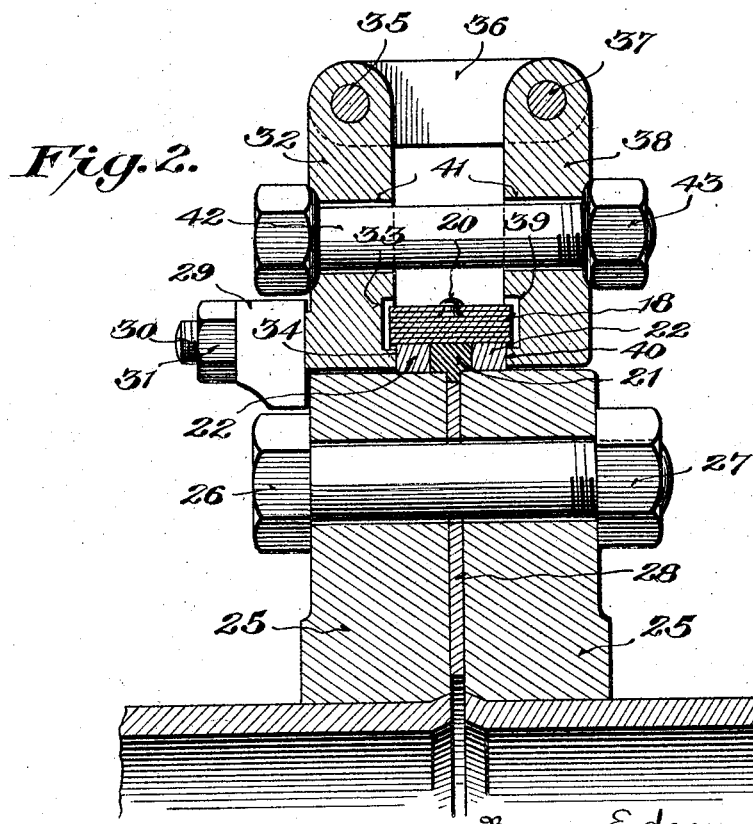
Inventor
Edmund F. Heard
By Cameron, Kirkam & Sutton
Attorneys Inventor
Edmund F. Heard
By
Cameron, Kirkam & Sutton
Attorneys

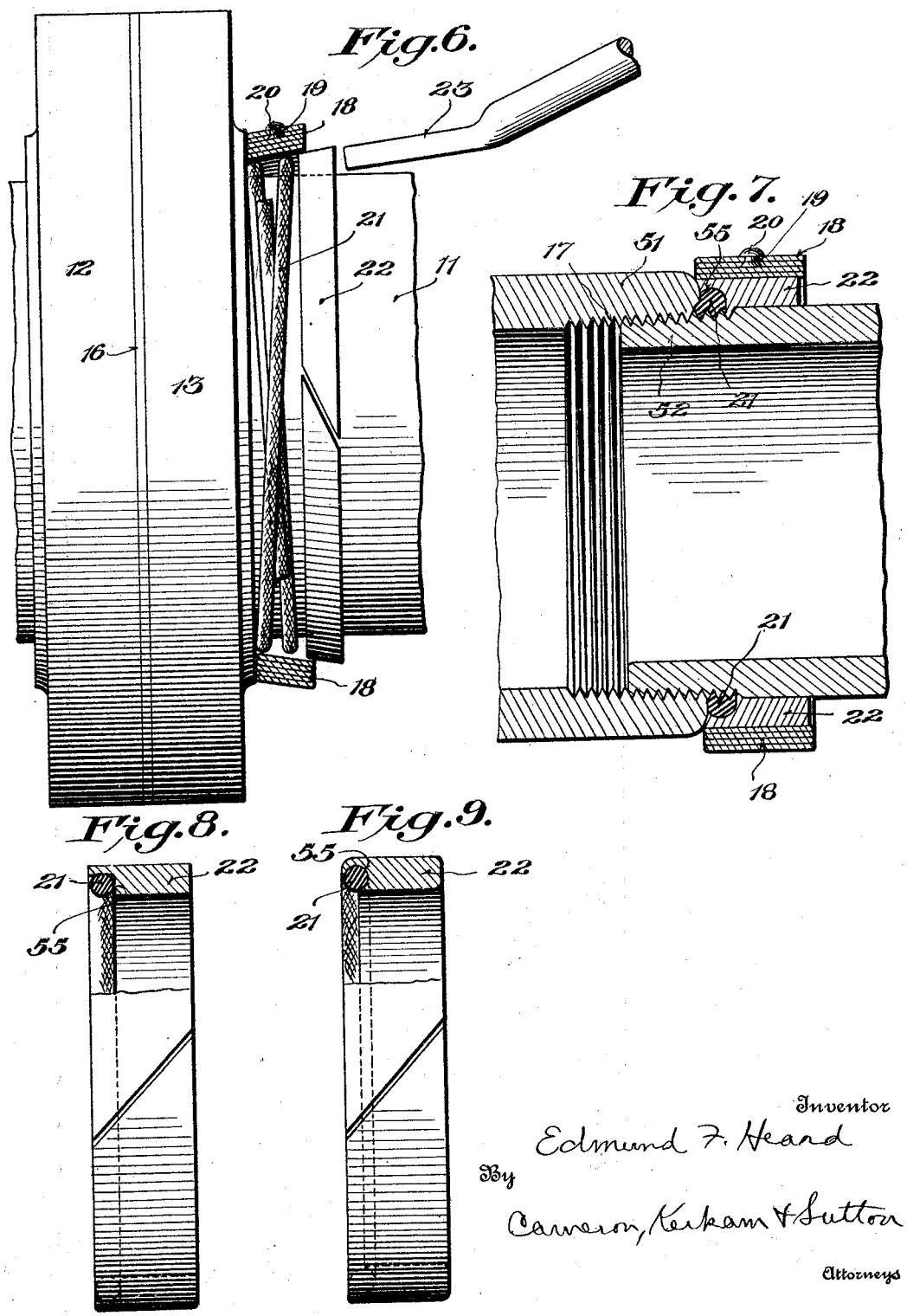

Patented Sept. 6, 1932

1,876,415

UNITED STATES PATENT OFFICE

EDMUND F. HEARD, OF HAMPTON, VIRGINIA

METHOD AND APPARATUS FOR SEALING LEAKS

Application filed May 19, 1927. Serial No. 192,673.

This invention relates to a method and apparatus for sealing leaks, particularly leaks between annular surfaces, as between the elements of a threaded pipe joint for example, although it is to be expressly understood that the term "annular" is not used in a strictly mathematical sense, as the invention is also applicable to the sealing of leaks between surfaces that are not strictly annular, as a leak between the head of a bolt and its contacting surface for example.

It has heretofore been proposed to seal a leak at a threaded joint by mounting a ring, made in halves for convenience of assembly, around the male member of the joint, centering the ring by means of set screws, integral projections or other analogous expedients, and forcing a packing gland or gasket material against the elements of the leaking joint. Devices of this character, however, are open to numerous serious objections:—they are relatively costly to manufacture; they must conform in size to the elements of the joint to be repaired and therefore afford little flexibility of application; they frequently make unsightly or inconvenient projections; they are generally difficult to install in confined spaces; they are often ineffective after a short time, as they work loose under repeated expansion and contraction of the joint elements or under vibration or changes of pressure; etc.

Among the objects of this invention are the provisions of a method and apparatus for sealing leaks between annular surfaces whereby the elements used are few and relatively simple and inexpensive, and easy to apply; whereby the elements used can be employed with equal facility with a wide variety of sizes of joints, so that the maintenance of a large stock of parts of predetermined sizes becomes unnecessary; whereby the elements used are self-aligning and self-centering so that set screws and similar elements become unnecessary; whereby the resultant seal is neat and compact, and does not add materially to the size of the joint or form unsightly or inconvenient projections thereon; whereby leaks in confined spaces may be readily sealed; whereby the sealing of the leaks is permanent in character, so that repeated expansion and contraction or vibration or changes of pressure do not cause the sealing elements to work loose.

Further objects of the invention include the provision of a method and apparatus for sealing leaks whereby leaks between annular surfaces may be quickly and easily sealed without the necessity of disconnecting or dismantling any of the parts of the leaking joint or relieving or changing the pressure or the temperature, or the putting out of service, of the parts in which the leak exists, and whereby the leak may be sealed with simple elements which are easy to maintain in stock, transport and apply.

Further objects of the invention include the provision of a method and apparatus for sealing leaks applicable to annular surfaces of any suitable size and character, and effective to seal leaks whether the excess pressure is on the inside or the outside of the leaking joint, and whether the joint is in a system through which flows a liquid, as water for example, or vapor, as steam for example, or gas, as compressed air for example, etc.

Other objects will appear as the description of the invention proceeds.

The method is capable of being carried out in a variety of ways and the apparatus used of taking a wide variety of forms, some of which are hereinafter explained and illustrated on the drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures:—

Fig. 1 shows the invention applied to the sealing of a leak in a threaded joint;

Fig. 2 shows the invention applied to the sealing of a leak at a flange joint;

Fig. 6 shows one manner of assembling the parts and one form which the sealing elements may take; and Figs. 7, 8 and 9 are cross sections of different forms which the sealing ring may take.

Figure 3:
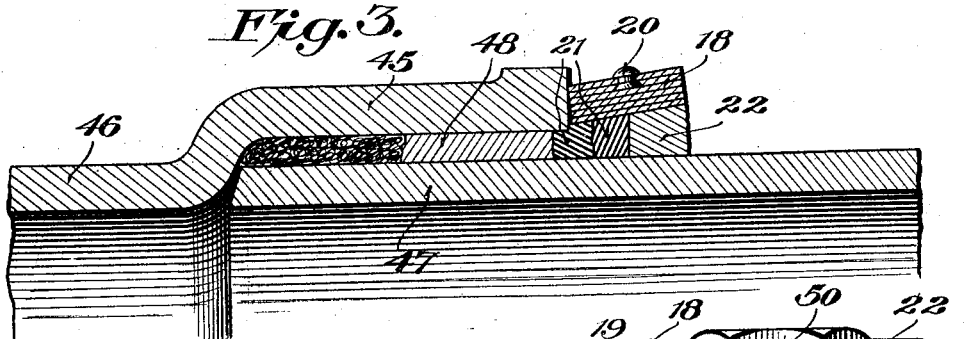
Fig. 3 shows the invention applied to the sealing of a leak in a bell-mouthed pipe joint.

Referring first to the apparatus employed, and through an explanation of which and its manner of use the method of this invention will be exemplified, a leak between any suitable annular surfaces, as between threaded surfaces (as exemplified in Figs. 1 and 7), or between overlapping elements (as exemplified in Fig. 3), or between flanges (as exemplified in Fig. 2), or around headed elements and the like (as exemplified in Fig. 4), is sealed by use of two elements which, for convenience of designation, will be referred to as the confining ring and the sealing ring. The confining ring is positioned around the leaking joint, the sealing ring is interposed between the confining ring and the elements of the leaking joint, and the sealing ring is then forced into sealing contact with the elements of the joint and between said elements and the confining ring by any suitable tool, as a caulking tool, as illustrated in Figs. 1 and 6, or by a specially provided squeezing tool as illustrated in Fig. 2, etc.

Although within certain broad aspects of this invention the sealing ring may be of the same material throughout, it preferably takes the form for most services, of a composite ring the elements of which may be applied separately to the sealing of the joint or the elements of which may be formed as a unit prior to the application thereof to the sealing of the joint, said elements being respectively composed of elastic or semi-elastic packing material and plastic retaining material, the latter, in the final position of the parts, coacting intimately with the packing material to maintain the packing material in sealing relation to the leak and the parts of the seal in a rigid and permanent condition.

Referring first to the embodiment of the invention illustrated in Fig. 1, where is illustrated a threaded joint composed of pipe sections 10 and 11 provided with flanges 12 and 13 secured together by bolts 14 and nuts 15, with suitable packing material 16 interposed between the flanges, let it be assumed that there is a leak at the threaded joint 17. To seal this leak a confining ring 18 is assembled around the male element of the joint. While within the broader aspects of this invention this ring may be of any suitable construction, I prefer to use a ring of novel construction as now to be described.

Figure 5:
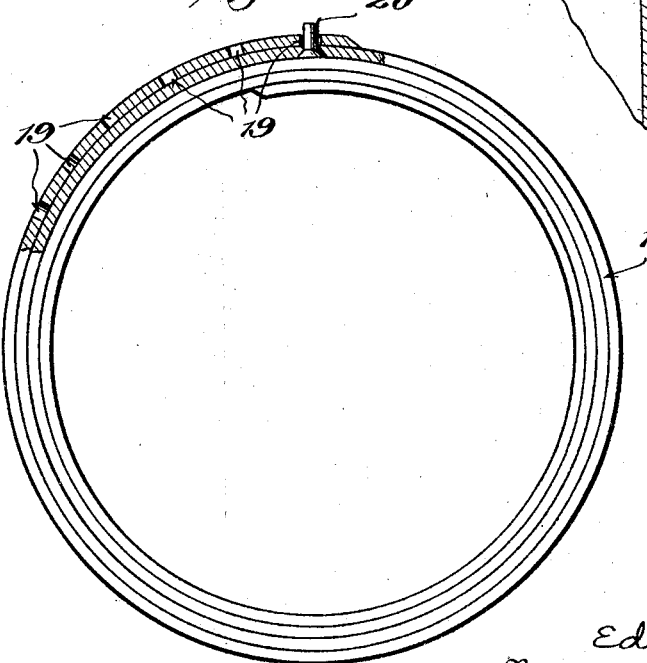
Fig. 5 shows, partly in section, an elevation of the confining ring.

As shown more particularly in Fig. 5, this confining ring 18 is composed of a long, thin flexible strip, and it is preferably so made as to assume a coiled shape naturally. This strip may be formed of any suitable material, but is preferably made of suitable metal, such as brass, steel, copper, etc., which has the necessary flexibility to permit it to readily assume a spiral form of various diameters and sufficient hardness, strength and resilience to form a ring of requisite stiffness and strength to resist deformation during the caulking operation to be described. Adjacent one end, said strip is provided with a suitable number of apertures 19, which may extend over as great a length of the strip as desired, so that the strip may be formed into rings of a wide variety of diameters with apertures in the two outer coils in register, to the end that a pin, rivet, bolt or other suitable retaining device may be passed through the aligned apertures and retain the ring at this diameter; or as shown a rivet 20 may be positioned at any suitable distance from the end of the strip and engaged in any one of the series of apertures 19 suitable for securing the desired diameter of the ring. By making the strip of any desired length and provided with spaced apertures over such a length that the ring may be coiled to any desired diameter and retained in this position by passing a suitable retaining device through aligned apertures, the strip provides great flexibility of service because it can be formed into rings of any suitable diameter needed. The inner size of the resulting ring may also be varied to some extent, if desired, by cutting off a suitable portion of the inner end of the strip. In some of the figures, the rivet 20 is shown as peened or headed over so as to fixedly clamp the coils permanently in position, but this is not essential as the expansive force exerted on the ring during the caulking operation, with the tension thereby imposed on the coils circumferentially thereof, prevents disengagement of the outer coil from the rivet.

The strip 18 may be made of any suitable width and thickness, depending upon the size and character of the joint, the character and pressure of the fluid involved, etc. For many purposes the strip may be formed as a straight strip so that when coiled it will form a cylindrical ring, as illustrated in Figs. 2 and 7, but for most purposes I prefer to cut the strip on a curve so that when rolled into a coil it will form a ring of frusto-conical shape as illustrated in Figs. 1, 3, 4 and 6. The frusto-conical formation possesses certain advantages in that it coacts with the sealing ring to be described to produce a component of force acting parallel to the surfaces of the joint as hereinafter explained.

The sealing ring, which is to go inside of the confining ring 18 and to be forced into sealing engagement with said ring and the elements of the joint, is made of any suitable cross section and of any suitable material so that it may be wrapped around the male joint element of the joint and lie between the confining ring 18 and said joint element. Where the elements of the joint are not subjected to substantial changes of temperature, pressure, vibration, etc., it is sometimes sufficient to use a sealing ring formed throughout of the same material, as a split ring of lead or tin for example. For most purposes, however, I prefer to use a composite sealing ring composed of elements of dissimilar material, one of the elements possessing the characteristic of elasticity or semi-elasticity and another element possessing the characteristic of plasticity.

In the form shown in Fig. 1, the sealing ring is composed of two elements of dissimilar material, a ring 21 of packing material and a ring 22 of plastic caulking material, preferably metallic, such as lead or tin. The ring 21 which may have any suitable cross section may be a single annulus of suitable packing material, of suitable diameter or width and thickness, split so as to permit it to be placed around the pipe element 11 and introduced into the confining ring 18 with its ends in substantially abutting or beveled overlapping relation—which requires a length of packing material fitted to the circumferential length of the element to which it is to be applied—or for simplicity I may use a long strip of packing material which may be wrapped around the pipe one or more times without the necessity of fitting the length of the strip to the circumference of that element—Fig. 1 showing the strip 21 wrapped around the pipe 11 twice. In either event the packing material may be formed in long lengths and coiled or wound onto reels or spools and cut off in any suitable lengths as desired.

Any suitable packing material may be used; thus it may be composed of braided flax, asbestos cotton packing, etc., or it may be asbestos or cotton mixed with a small percentage of rubber, which may be unvulcanized or partly vulcanized or entirely vulcanized as desired, or it may be composed of any suitable fibrous material impregnated with gummy material such as shellac or resin, or it may be mineral wool mixed with a small quantity of vulcanized or unvulcanized rubber, silicates and graphite mixed together, etc. It should be a material which possesses elasticity or semi-elasticity so that it will give and take under forces of expansion and contraction, changes of pressure, vibration, etc., and if desired it may be formed in whole, or in part, of material which will harden or vulcanize, either under the temperature of the joint or by reason of heat externally applied thereto, using for example such material as "Furmanite."

The other element 22 of the sealing ring takes the form of a split ring of any suitable cross section and composed of plastic material, preferably metallic, such as lead or tin or one of the soft alloys, although a harder metal may be employed where high pressure is involved, said ring being of suitable width, thickness and length to substantially fill the space within the ring 18 when caulked or otherwise suitably forced into the annular space between the joint and said ring 18.

Said caulking ring 22 may be a split ring predeterminately formed to proper size, or it may be formed by cutting off a suitable length of appropriate material and wrapped around the joint element with its ends in abutting or beveled overlapping relation. The caulking ring 22 is then forced or squeezed in any suitable way into the confining ring 18 so as to force the packing ring 21 into the leaking joint to form a tight permanent seal, a common hand caulking tool 23 being illustrated in Fig. 1 as a suitable and convenient means for performing this function.

The procedure followed in sealing a leak is also illustrated in detail in Fig. 6, wherein the parts bear the same reference characters as in Fig. 1. As here shown, a length of packing material 21 is wrapped around the pipe 11 at the leak, a confining ring 18 is wrapped around the packing material with the rivet 20 engaged in one of the apertures 19—or the ring 18 may be formed first and the packing ring 21 introduced afterwards—and a ring 22 of plastic metal is then placed around the pipe at the entrance to the confining ring, and with a caulking tool 23, it is driven home tightly to form the seal.

Whether the confining ring is cylindrical or frusto-conical in shape, the forcing of the ring 22 into the ring 18 causes the coils of the ring 18 to be pressed outwardly so that they tightly grip each other frictionally, and the ring is rendered as stiff and rigid as if it were originally formed of a thickness equal to the sum of the several layers of the coil. At the same time, the packing material is driven intimately into the joint between the surfaces through which the leak is occurring, and against the surfaces of both members of the joint adjacent thereto, and the plastic metal is driven into firm gripping contact both with the confining ring and the joint elements, so that the parts are permanently secured together against displacement and the further escape of fluid between the surfaces of the joint is effectively prevented. When the confining ring is made of frusto-conical form, the forcing in of the plastic metal is productive of a component of force in a direction parallel to the surfaces of the joint so that, taking Fig. 1 for example, the confining ring 18 is forced and retained against the flange 13 while the packing material 21 is compacted and driven intimately into sealing contact with the pipe 11 and flange 13 by the wedging action of the confining ring 18 on the packing and plastic material.

Fig. 2 illustrates the present invention applied to the sealing of a leak between a pair of flanges 25 held together by bolts 26 and 27 with suitable packing material 28 interposed therebetween. Here the confining ring 18 takes a cylindrical form. The packing material 21 is shown in the form of a single ring of generally rectilinear cross section wrapped once around the periphery of the flanges opposite the joint therebetween, and a pair of rings 22 of plastic metal is forced into the ring 18 at opposite sides of the packing material 21 to squeeze the latter into leak-sealing contact with the joint between the flanges and to form a permanent seal of the character heretofore described.

This figure also illustrates a form of squeezing or caulking apparatus that may be used where pressure is to be applied simultaneously at both sides. This apparatus is composed of a base member 29 which carries, by means of the threaded stud 30 and nut 31, a jaw 32 cut away at 33 to provide a clamping face 34. Pivoted to the end of said jaw 32 at 35 is a link 36 to which is pivoted at 37 a second jaw 38, which is cut away at 39 to provide a second clamping face 40. Jaws 32 and 38 with their clamping faces 34 and 40 may extend to any desired extent circumferentially of the flanges 25, and are provided with one or more pairs of aligned apertures 41 through which bolts 42 may be passed and nuts 43 threaded onto the projecting ends thereof. This device is mounted on one of the flanges 25, with the clamping face 34 of the jaw 32 in contact with one of the rings 22, and the clamping face 40 of the jaw 38 in contact with the opposite ring 22. Bolts 42 having been passed through the aligned apertures 41, nuts 43 are threaded on the projecting ends thereof and gradually tightened up to the extent desired. As the nuts 43 are tightened, the jaws 32 and 38 are forced to apply opposite and equal pressure to the two rings 22 of plastic metal, whereby the latter and the packing material 21 are driven home to effect the seal.

In Fig. 3 the invention is shown applied to a bell-mouthed joint formed between the overlying flange 45 of pipe 46 and the end of pipe 47 with packing material 48, which has previously been caulked into place, between the elements 45 and 47. The present invention enables a leak between the elements 45 and 47 to be sealed even though the caulking material 48 has been driven in so far that further caulking thereof is impossible.

Figure 4:
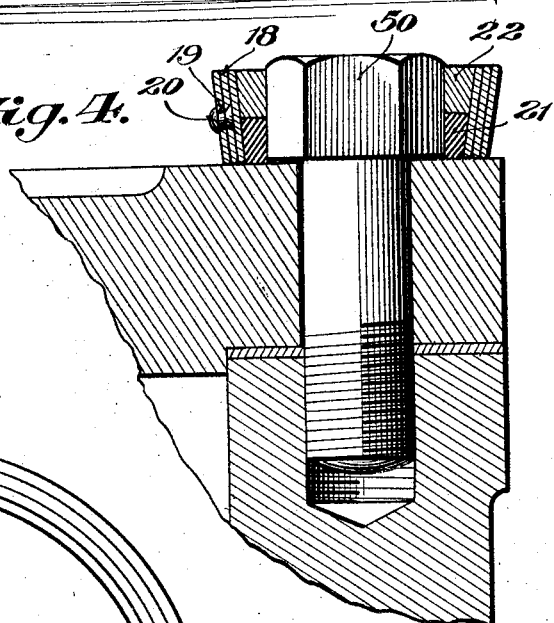
Fig. 4 shows the invention applied to the sealing of a leak around the head of a bolt.

In Fig. 4 the invention is shown applied to the sealing of a leak around a bolt head 50. The confining ring 18 is formed as heretofore described, the packing material is illustrated as a single ring 21 wrapped around the head of the bolt, and the plastic metal 22 is shown as driven into the confining ring 18 to effect the seal as heretofore described.

Fig. 7 illustrates another embodiment of the invention wherein a leak between the threaded ends 51 and 52 of a pipe joint has been sealed, the confining ring 18 being here shown as of generally cylindrical form, although it may be of frusto-conical form as shown in Fig. 4, and the composite sealing ring 21, 22 being shown as of the character illustrated in Fig. 9, now to be described.

If desired, the composite sealing ring may be assembled before it is introduced into the confining ring 18, whether the latter be of cylindrical or frusto-conical formation. Fig. 8 shows a sealing ring wherein the plastic metal ring 22 is cut away at one side to provide a recess 55, and the packing ring 21 is preliminarily positioned in the recess 55 so that the two may be introduced as a unit into the space between the confining ring 18 and the elements of the joint. This construction is suitable where the repair man wishes to assemble the packing ring as need arises. Fig. 9 illustrates a construction wherein the composite sealing ring may be formed as a unit by the manufacturer of the parts. Here, as in the embodiment of Fig. 8, the ring of plastic metal 22 is provided with a recess 55 formed therein in any suitable way, but the ring of packing material 21 is permanently secured therein, as by squeezing the plastic metal about the same as illustrated—or the caulking material 22 may be cast around ring 21. Whether the composite sealing ring is formed as in Fig. 8 or in Fig. 9, when it is introduced into the confining ring 18 and suitably caulked therein, as illustrated in Fig. 7, the sealing ring acts in the same manner as heretofore described in conjunction with other embodiments of the invention.

It will therefore be perceived that a simple, efficient and expeditious method and apparatus for sealing leaks between annular surfaces have been provided. The leak may be sealed without disconnecting or dismantling any of the parts of the joint, and without relieving or changing the pressure or temperature of any of the parts, and hence this procedure enables a leak to be sealed at once without waiting for the pressure to be relieved or the temperature to go down, and without requiring a disconnection of any of the parts or the throwing out of operation of any of the apparatus, supplied with fluid by means of the system in which the leaking joint exists.

All of the parts used are simple and inexpensive in character and of a type that may be readily kept in stock and easily transported to the place of the leak. The packing material may be readily kept in reels or coils of any desired length and the plastic metal rings may be formed of strips or they may be readily trimmed to size by cutting off excess length, and thus it is not necessary to keep on hand a stock of rings, of either packing material or plastic metal, to fit all of the various elements of the joints in service. Similarly, the flexible metallic strip which constitutes the retaining ring is capable of general application and only one size or only a few sizes need be kept on hand because of the facility with which such a strip may be formed into rings of various diameters as need arises.

Therefore the method and apparatus of the present invention require only a minimum stock of material and parts, because the strip 18 can be formed into a ring of the desired diameter and suitable lengths of packing material 21 and caulking material 22 can be cut to proper lengths for the sealing of leaks in joints of a wide variety of shapes, characters and sizes. For most purposes the only tool required is the ordinary hand caulking tool with a hammer or mallet, and therefore no expensive equipment is required, while the leak can be sealed by an ordinary workman, because no special skill or training is needed.

As shown in the drawings, the seal adds little, if anything, to the diameter of the elements to which it is applied, being of little, if any, larger diameter than the larger member of the pipe joint for example, and therefore it includes no projections that are likely to cause annoyance and no protuberance that detracts from the neatness or appearance of the joint. The character of the elements used and the character of operations employed are such as to enable leaks to be sealed in confined spaces, and the structure of the resultant seal is strong, rigid and permanent in character, so that it is adapted to endure as long as the elements with which it is associated.

If desired, the coils of the confining ring 18 may be soldered together after the parts are formed, although such is ordinarily not necessary. Where the service or fluid involved is of a character that may result in oxidation or corrosion of the ring 18, I may coat the strip or ring with shellac or other suitable protective material either before or after the seal is effected. I have found from experience that such coating material tends to bake or cement the coils of the ring 18 together when used with a joint which is normally heated, and thereby a permanent integral attachment of the coils of the retaining ring is effected.

The materials used and the sizes used will vary with the pressures employed, the size of the joints, the character of fluid employed, conditions of service, etc., the parts being selected of such material, size and strength as to make and maintain a seal of the desired strength and rigidity.

While the embodiments of the invention illustrated on the drawings have been described with considerable particularity and preferred procedures have been explained in considerable detail, it is to be expressly understood that the invention is not restricted to the forms or procedures described, as the same is capable of being carried out in a wide variety of ways and with elements of a wide variety of shapes, constructions, arrangements, and proportions of parts without departing from the spirit of this invention, as will now be readily apparent to those skilled in the art, while changes may be made in the details of construction and in the order of procedure, and certain features used without other features, without departing from the spirit of the invention. Reference is therefore to be had to the claims hereto appended for a definition of the invention.

What is claimed is:

1. The method of sealing leaks in joints between annular surfaces which includes wrapping a flexible strip around and retaining the same in position to form a ring surrounding but spaced from the joint between said surfaces, caulking sealing material between said ring and said joint into retaining and joint sealing engagement therewith, and uniting the coils of said strip to render the same into an integral ring.

2. The method of sealing leaks in joints between annular surfaces which includes wrapping around the joint of said surfaces a flexible strip coated with a protective material which will cement the coils of said strip together, retaining said strip in ring formation surrounding but spaced from said joint, and caulking sealing material into the annular space between said ring and joint. in retaining and joint sealing engagement therein.

3. The method of sealing leaks in joints between annular surfaces which includes mounting an interiorly frusto-conical ring around but spaced from the joint between said surfaces to provide a tapering space leading to said joint, positioning packing material and plastic material around said joint within said ring, and caulking the plastic material into said ring to force and maintain said packing material in sealing contact with said joint.

4. The method of forming a ring for use in sealing leaks in joints between annular surfaces which includes wrapping a curved flexible strip into an interiorly frusto-conical ring and securing said strip in ring formation.

5. In a device for sealing leaks in joints between annular surfaces, an interiorly frusto-conical ring providing an outwardly opening wedge-shaped caulking space and positioned around and in spaced relation to the joint between said surfaces, and sealing means caulked into the space between said ring and said surfaces in retaining and joint sealing engagement therewith.

6. In a device for sealing leaks in joints between annular surfaces, a flexible coiled frusto-conical retaining ring providing an outwardly opening wedge-shaped caulking space and positioned around the joint between said surfaces in spaced relation thereto, and sealing means caulked into the space between said ring and said surfaces in retaining and joint sealing engagement therewith.

7. In a device for sealing leaks in joints between annular surfaces, a flexible retaining ring wrapped around the joint between said surfaces in spaced relation thereto, a ring of packing material interposed between said confining ring and said joint, and a ring of plastic material caulked into the space between said confining ring and said joint to force and maintain said packing material in sealing contact with said joint.

8. In a device for sealing leaks in joints between annular surfaces, a flexible retaining ring wrapped around the joint between said surfaces in spaced relation thereto, a strip of packing material wrapped around said joint within said ring, and a ring of plastic material caulked into said ring to force and maintain said packing material in sealing contact with said surfaces.

9. In a device for sealing leaks in joints between annular surfaces, a flexible retaining ring wrapped around the joint between said surfaces in spaced relation thereto, packing material interposed between said ring and said joint, and a plastic ring caulked into said confining ring to force and maintain said packing material in sealing engagement with said joint, said packing material being composed of fibrous material impregnated with elastic material.

10. In a device for sealing leaks in joints between annular surfaces, an interiorly frusto-conical ring providing an outwardly opening wedge-shaped caulking space and positioned around and in spaced relation to the joint between said surfaces, and sealing means caulked into said ring in retaining engagement between said ring and surfaces and comprising a caulking material which carries a packing material in sealing contact with said joint.

11. In a device for sealing leaks in joints between annular surfaces, a long flexible strip coiled into a ring around the joint between said surfaces in spaced relation thereto, means for retaining said strip in ring formation, and sealing means caulked into said ring in retaining engagement between said ring and surfaces and in sealing engagement with said joint.

12. In a device for sealing leaks in joints between annular surfaces, a long flexible metallic strip coiled into a ring around the joint between said surfaces in spaced relation thereto, means whereby said strip may be formed into rings of various diameters and retained in ring formation, and sealing means caulked into said ring in sealing engagement with said joint and in retaining engagement between said ring and surfaces.

13. In a device for sealing leaks in joints between annular surfaces, a long flexible strip coated with protective material and coiled into a ring around the joint between said surfaces in spaced relation thereto, the protective material being adapted to cement the coils of said ring together, means for retaining said strip in ring formation, and sealing means caulked into the space between said ring and surfaces in sealing and retaining engagement.

14. In a device for sealing leaks in joints between annular surfaces, a long curved flexible strip coiled into an interiorly frusto-conical ring around the joint between said surfaces in spaced relation thereto, means for retaining said strip in ring formation, and sealing means caulked into the space between said ring and said surfaces in sealing and retaining engagement.

In testimony whereof I have signed this specification.

EDMUND F. HEARD.